Patented Mar. 12, 1940

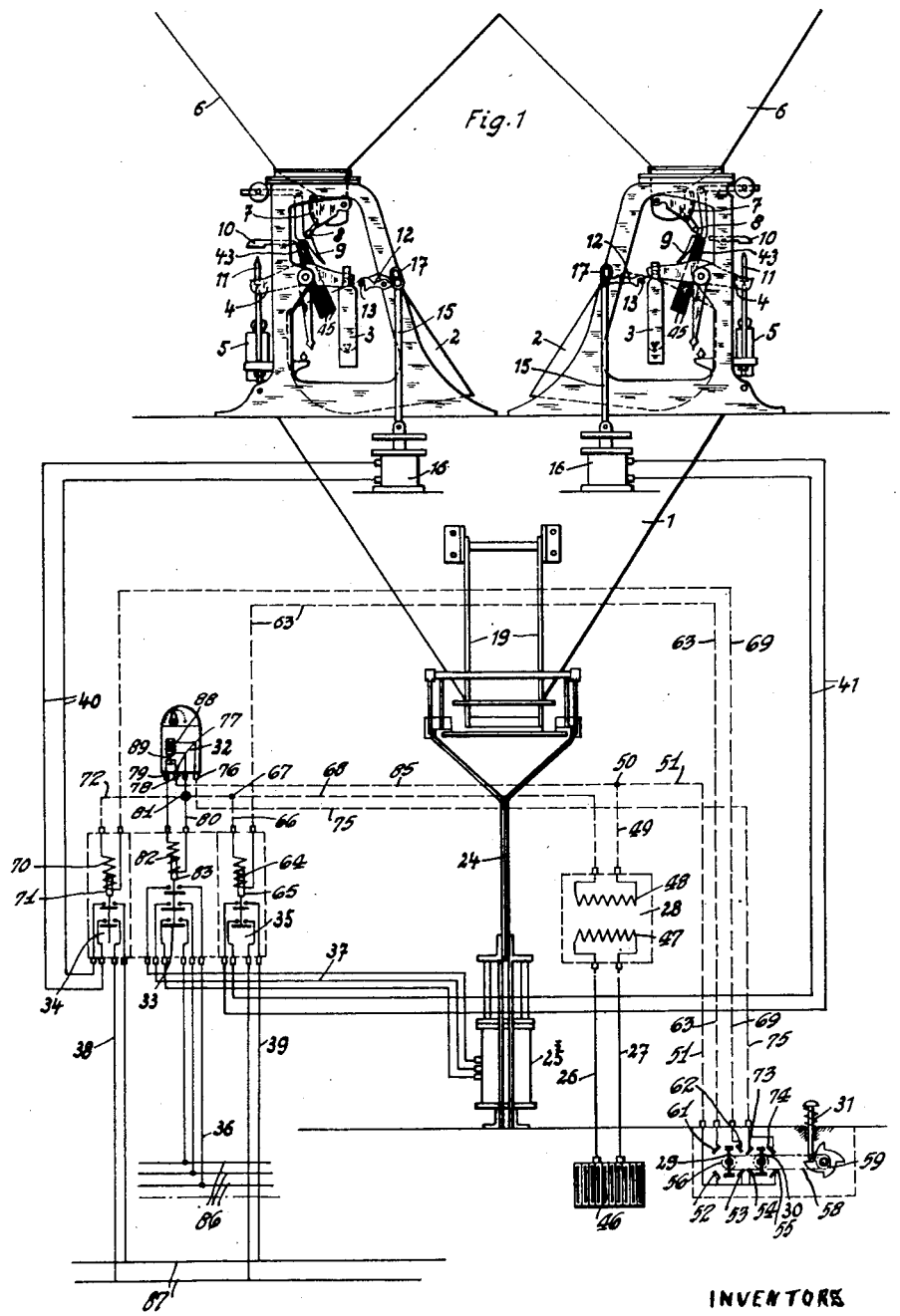

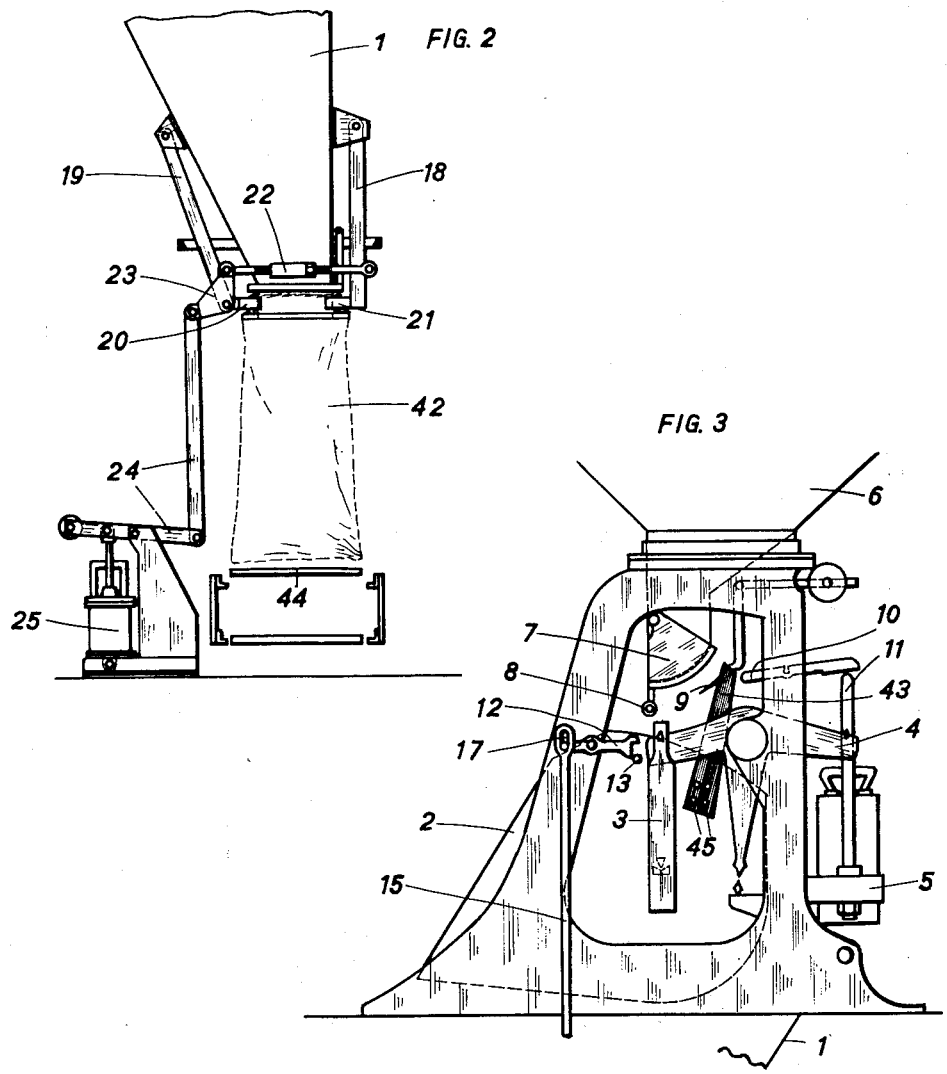
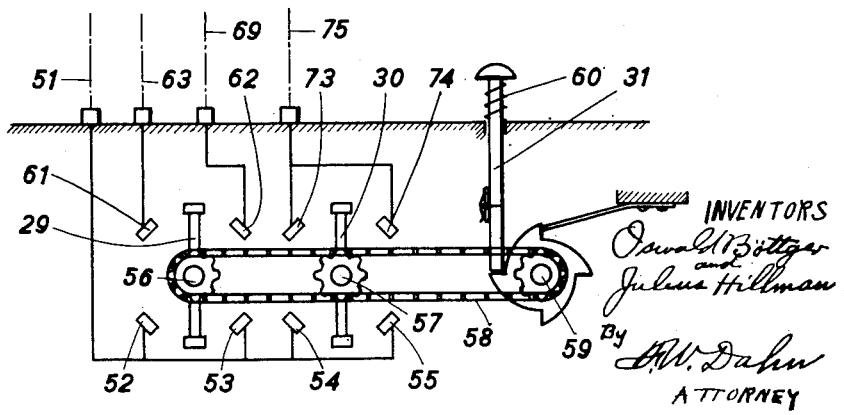

2,193,709

UNITED STATES PATENT OFFICE 2,193,709

WEIGHING AND SACK FILLING MACHINE

Oswald Böttger and Julius Hillmann, Brunswick, Germany, assignors to Miag Mühlenbau und Industrie Aktiengesellschaft, Brunswick, Germany Application March 8, 1938, Serial No. 194,695
In Germany March 10, 1937

8 Claims. (Cl. 249—61)

Our invention relates to improvements in sack filling machines, and more particularly in sack filling machines which are combined with an automatic weighing machine. The object of the improvements is to provide a machine of this type by means of which within a short period of time a large number of sacks may be filled. With this object in view our invention consists in connecting the mechanism for holding the sack with a retarding device for opening the said holding mechanism, which retarding device consists for example of a motor and a time controlled relay cooperating therewith, and which is adapted to open the holding mechanism exactly after the time interval needed for filling a sack.

Where a plurality of scales are provided above the same sack filling chute the coupling means between the holding device and the scales are preferably constructed so that the scales are alternately made operative.

For the purpose of explaining the invention an example embodying the same has been shown in the accompanying drawings in which the same reference characters have been used in all the views to indicate corresponding parts. In said drawings, Fig. 1 is a diagrammatical elevation showing the weighing and sack filling machine, Fig. 2 is a fragmentary elevation on an enlarged scale showing the filling chute and the sack holding device, and Figs. 3 and 4 are elevations of parts shown in Fig. 1, but on a larger scale.

In the example shown in the drawings the sack filling machine comprises a chute 1 in the form of a funnel which cooperates with a plurality of automatic weighing machines each comprising a tiltable material weigh hopper 2, the figures showing two weighing machines associated with the chute. Each material weigh hopper 2 is suspended by means of a link 3 from one arm of a beam 4 the other arm carrying a scale 5 for the weights. The material weigh hoppers 2 are filled through chutes or funnels 6 the delivery openings of which are adapted to be alternately closed by pivotally mounted gates 7, so that at a time only one of the material weigh hoppers 2 is filled. The gate 7 is locked in open position by means of a pivotally mounted arm 9 having a heel engaging a roller 8 of the gate 7, the said arm being locked in locking position by means of a latch 10. After the desired amount of material has been supplied to the material weigh hopper 2 the beam 4 assumes its median position, and thereby it turns the latch 10 cooperating therewith through the intermediary of a feeler 11 into releasing position, so that the arm 9 releases the roller of the gate 7. Now the said gate closes the chute 6 by gravity, and it prevents further supply of material into the material weigh hopper 2.

The material weigh hopper 2 is locked as against tilting by means of a pawl 12 pivotally mounted on a stationary part of the weighing machine and engaging a nose 13 of the material weigh hopper. The pawl is adapted to be set into releasing position by means of a link 15 formed at its top end with a slot 17 engaging a pin fixed to the pawl 12, the said link being adapted to be operated by means of an electro-magnet 16. After the material weigh hopper has been released it delivers its charge into the funnel 1, and after being emptied it is automatically returned into the initial position shown in Fig. 1. In this operation an arm 43 fixed to the material weigh hopper engages the roller 8 of the gate 7 and returns the said gate into opening position in which it is again locked by the arm 9.

To opposite sides of the funnel 1 pairs of arms 18 and 19 are pivotally mounted which carry segmental clamping jaws 20 and 21 at their bottom ends, by means of which a sack placed on the delivery end of the funnel may be held in position. At their bottom ends the arms 19 of the clamping jaw 20 carry bell crank levers 23 which are connected with the arms 18 of the second jaw 21 by means of a link 22 provided with suitable means for adjusting the length thereof. By means of a link 24 and a bell crank lever the said bell crank levers 23 are connected with an electro-motor 25 constructed in the form of an electro-magnet. Thus, by the operation of the said electro-magnet the clamping jaws 20 and 21 are positively opened and closed.

The control of the holding devices 20, 21 as well as of the locking and releasing devices 12, 13 for the tiltable material weigh hopper 2 is electrical. A source of current 46 is connected by means of conductors 26, 27 to the primary 47 of a transformer 28. From the secondary 48 of this transformer 28 a conductor 49 leads to a connector 50 and from this a conductor leads to four successively arranged contacts 52, 53, 54, 55. The two contacts 52 and 53 coact with a rotary switch 29, whereas the two contacts 54 and 55 coact with a second rotary switch 30. The rotary switches 29 and 30 are provided respectively with sprockets, shown at 56 and 57, fixed to said switches to rotate therewith and a sprocket chain 58 extends about both of said sprockets, this chain also extending about a sprocket 59 rotatable by means of a foot pressed plunger 31 normally held in its upper position by a spring 60. The first named rotary switch member 29 is adapted to engage with either of two contacts 61 and 62. A conductor 63 extends from contact 61 to the coil 64 of electromagnet 65 for operating a switch 35. The other end of the coil 64 is connected by means of a conductor 66 with a conductor 67 from which a conductor 68 leads to the secondary 48 of the transformer 28.

From the contact 62 of the rotary switch member 29 a conductor 69 leads to the coil 70 of an electromagnet having an armature 71 for operating the switch 34. The other end of this coil 70 is connected by a conductor 72 with a connector 67, from which the conductor 68 leads to the secondary 48 of the transformer 28.

A pair of contacts 73, 74 are arranged at the opposite side of the rotary switch member 30 from the contacts 54 and 55, both contacts 73 and 74 being connected to a common conductor 75, which conductor leads to a contact 76 of a time relay 32. Between the contacts 76 and 78 there is a coil 88, which serves to actuate an armature 89. This armature is held in elevated position by the time relay 32 until after expiration of the time for which said relay is set. In this position of the armature 89 it bridges two other contacts 77, 79 fixed to the time relay 32, between which contacts an electromagnet coil 82 is interposed. The conductor 80 for the coil 82 is connected at 81 to the conductors 68 and 72, which coil 82 encircles the armature 83 of a double-acting switch 33. From the contact 78 of the time relay 32 a conductor 85 extends to a connector 50 and so by the conductor 49 to the secondary 48 of the transformer 28.

A three-phase circuit 36 is connected to a three-phase circuit 86, the circuit 36 leading to the double-acting switch 33. From this switch a three-phase circuit 37 leads to the electromagnet 25, which operates the sack holding devices 20, 21 by means of a linkage 24.

A two-phase circuit 38 leads from a circuit 87 to a switch 34 and a two-phase circuit 40 leads from this to the electromagnet 16, which operates the detent 12 of the left-hand scale in Fig. 1 by means of the connecting rod 15. There is also a two-phase circuit 39 leading from the circuit 87 to the switch 35, from which a two-phase circuit 41 leads to the other electromagnet 16 which controls the righthand material weigh hopper in Fig. 1 through the connecting rod 15.

When the device is to be put into operation a sack 42 is placed on the delivery spout of the funnel 1 and the plunger 31 is depressed. Depression of the plunger 31 causes both the rotary switch members 29 and 30 to rotate through an arc of 90° by reason of the connection of the chain 58 with the sprockets fixed to the various parts. Due to the movement of the rotary members 29, 30 into engagement with the contacts 61, 53 and 73, 55 the following circuits are closed:

A circuit through parts 48, 49, 50, 51, 53, 29, 61, 63, 64, 66, 67, 68 and 48 whereby the armature 65 for the switch 35 is lifted and the switch 35 is closed.

The closing of the switch 35 closes a second circuit, namely: 87, 39, 35 and 41 to the electromagnet 16 of the scale shown at the right in Fig. 1. The operation of the material weigh hopper 2 in connection with the discharge of the material therein after such operation of the electromagnet 16 is described hereinafter. A third circuit is also closed at this time, namely: 48, 49, 50, 57, 55, 30, 73, 75, 76, 88, 77, 80, 81, 68 and 48. By reason of the closing of this circuit the armature 89 of coil 88 is raised and is held in raised position for a predetermined time according to the setting of the time relay 32. The armature 89 now bridges contacts 78, 79 setting up the following circuit: 48, 49, 50, 85, 78, 89, 79, 82, 80, 81, 68 and 48. Due to the closing of this circuit the armature 83 of coil 82 is lifted and thereby the double-acting switch 33 is brought into one of its end positions. In this manner a new circuit is closed through the double-acting switch member 33, namely: 86, 36, 33, 37 and 25, so that the electro-motor 25 is now operated, whereby the holding arrangements 18, 19, 20, 21 are operated through linkage 23, 24 to press the upper portion of sack 42 into tight engagement with the delivery spout of the funnel 1. The electromagnet 16 of the righthand scale being operated by the closing of the switch 35 will pull down the connecting rod 15 and lift the free end of the detent 12, thus releasing the nose 13 of the material weigh hopper and this hopper is now moved to its discharge position by the weight of the material that has been supplied thereto. After the rotary switch 29 has passed the contacts 53 and 61 the switch 35 and the electromagnet 16 are again deenergized and the detent 12 will fall back into position for engagement with the nose 13. As soon as the weighed material has run out of the hopper 2 this hopper will return to its upright receiving position due to its off center support, so that the nose 13 will engage with the detent 12 and prevent the tiltable hopper from tipping in counterclockwise direction. In this return movement of the hopper 2 the arm 43 will strike against the roller 8 of the gate 7 and will open the gate so that fresh material can run out of the fixed hopper 6 and into the tiltable hopper 2. The filled sack is held in position on the funnel 1 until the time has elapsed for which the time relay was set. At the expiration of such time the armature of the time relay is released and the bridging of the contacts 78, 79 ceases. This deenergizes the coil 82 whereupon the armature 83 descends to a position in which the double-acting switch is idle. Thus the circuit 86, 36, 33, 37, and 25 is broken so that the electro-magnet 25 is deenergized and thereupon the sack holding means 18, 19, 20, 21 is released through the linkage 23, 24.

The filled sack can now be taken off and replaced by an empty one. As shown in the drawings the filled sack can be carried away, as by a belt conveyor, to some convenient assembling point.

As soon as a new sack has been positioned on the delivery spout of the funnel 1 the plunger 31 may again be actuated, whereupon by the action of the chain 58 upon the sprockets 56, 57 the rotary switch members 29, 30 are again rotated forwardly through one-fourth of a complete revolution. Thereupon the contact 52 is placed in circuit with contact 62 and simultaneously the contact 54 is placed in circuit with contact 74.

Upon this movement of the switch members 29, 30 the following circuits will be closed: (1) 48, 49, 50, 51, 52, 29, 62, 70, 72, 81, 68 and 48, and (2) 48, 49, 50, 51, 54, 30, 74, 75, 76, 88, 77, 80, 81, 68 and 48.

By means of the first circuit just described the armature 71 will be raised and thereby the switch 34 will be closed whereupon the following circuit is closed: 87, 38, 34 and 40, and the lefthand electromagnet 16 in Fig. 1 will be energized, pulling down the connecting rod 15 to remove the detent 12 from its active position and permitting the above described mechanical operation to occur with reference to the scales shown at the left in Fig. 1, i. e.; the detent 12 is lifted whereupon the nose is freed and the tiltable material weigh hopper is moved to its discharging position due to the weight of the material that has been supplied thereto, so as to discharge its contents into the hopper 1. After becoming empty the hopper 2 returns automatically to position on account of its off center suspension, whereupon the detent 12 returns to position for holding the hopper as soon as the circuit through switch 34 and electromagnet 16 has been broken, when the rotary switch members 29, 30 move out of engagement with contacts 52, 62 and 54, 74 respectively.

The second-named circuit is operated in the manner already described above and thereby the double-acting switch member 33 is brought into its other end position.

We claim:

1. A sack filling machine, comprising a weighing means, a chute positioned to receive material discharged therefrom, means for operating said weighing means to discharge material to said chute, means for holding a sack in position to receive material from said chute, and coordinated controlling means to first position said sack-holding means, then to cause discharge of material from said weighing means, and then to release said sack-holding means, said controlling means including retarding means arranged to cause the sack-holding means to remain operative for the time necessary for the filling of the sack.

2. A sack filling machine, comprising a plurality of automatic weighing machines, a chute in position for alternately receiving material from said weighing machines, means for applying a sack to said chute, electrical operating means for said applying means including a retarding device adapted to hold said applying means in applying position for a length of time needed for filling the sack, means for causing said weighing machines to discharge alternately into said chute, and means for coordinating the action of the discharging means of the several weighing machines with that of the sack applying means.

3. Apparatus as claimed in claim 1 including a pair of pivotally mounted clamping jaws connected with each other by an arm of a bell crank lever and a link for simultaneous operation, and an electro-motor connected with the other arm of the said bell crank lever.

4. A weighing machine as claimed in claim 1, comprising an electromotor connected with the positioning means for said sack-holding means and a foot operating member for said electromotor.

5. A weighing machine as claimed in claim 1, including an electromotor said retarding device comprising a time controlled relay, a double-acting switch operated by said relay for controlling the said motor so as to cause a sack to be held in material receiving position during the filling operation and to be released at the end of the filling operation.

6. A weighing machine as claimed in claim 2, comprising electro-magnets one for each of said weighing machines and controlling the delivering operation thereof, and foot operated switches controlling the said electro-magnets.

7. A weighing machine as claimed in claim 2, comprising electro-magnets one for each of said weighing machines and controlling the delivering operation thereof, a material weigh hopper for each weighing machine and foot operated switches controlling the said electro-magnets, the said controlling means for the weighing machines comprising pawls adapted to lock the material weigh hopper of said weighing machines in filling positions, and links in pin and slot engagement with said pawls connected with said electro-magnets.

8. A weighing machine as claimed in claim 2, in which the means for controlling said weighing machines comprise rotary switches connected with each other and each controlling one of said weighing machines and connected with each other for alternate operation of said weighing machines, and foot operated means for operating said rotary switches.

OSWALD BÖTTGER.
JULIUS HILLMANN.